United States Patent
Crawley et al.

(10) Patent No.: US 6,768,504 B2
(45) Date of Patent: Jul. 27, 2004

(54) DEVICE AND METHOD FOR MONITORING A LASER-MARKING DEVICE

(75) Inventors: Brett Torre Crawley, Carpentersville, IL (US); Jeroen Verheul, Oldehove (NL); Danny W. Smit, Utrecht (NL); Rene Andeweg, Rotterdam (NL)

(73) Assignee: Videojet Technologies Inc., Wood Dale, IL (US)

( * ) Notice: Subject to any disclaimer, the term of this patent is extended or adjusted under 35 U.S.C. 154(b) by 248 days.

(21) Appl. No.: 09/823,666

(22) Filed: Mar. 31, 2001

(65) Prior Publication Data

US 2002/0140567 A1 Oct. 3, 2002

(51) Int. Cl.[7] ............................ B41J 2/435; B23K 26/08
(52) U.S. Cl. ............................ 347/224; 219/121.78
(58) Field of Search ........................ 347/224, 234, 347/248, 236, 246; 219/121.62, 121.68, 121.78, 121.81, 121.83; 372/23; 250/214 R; 73/587, 866.5

(56) References Cited

U.S. PATENT DOCUMENTS

| | | | |
|---|---|---|---|
| 4,652,722 A | 3/1987 | Stone et al. | 219/121.76 |
| 5,294,774 A | 3/1994 | Stone | 219/121.77 |
| 5,361,268 A * | 11/1994 | Fossey et al. | 372/23 |
| 5,520,062 A * | 5/1996 | Watanabe et al. | 73/866.5 |
| RE35,446 E | 2/1997 | Stone | 219/121.76 |
| 5,629,484 A * | 5/1997 | Liska | 73/587 |
| 5,653,900 A * | 8/1997 | Clement et al. | 219/121.68 |
| 5,670,173 A | 9/1997 | Chang et al. | 424/533 |
| 5,675,150 A | 10/1997 | Kunz | 250/341.1 |
| 5,877,664 A | 3/1999 | Jackson, Jr. | 335/205 |
| 5,880,538 A | 3/1999 | Schulz | 307/109 |
| 5,923,029 A * | 7/1999 | Sanderson et al. | 250/214 R |

FOREIGN PATENT DOCUMENTS

JP  2000046644 A  2/2000  ............. G01J/1/04

OTHER PUBLICATIONS

"Installation Instructions for Infrared Thermal Switching with The SnakeEye", pp. 1–5.
"EXERGEN's Irt/c Book", Oct. 25, 1999, www.exergen.com/prirbkrl.htm, pp. 1–6.

* cited by examiner

Primary Examiner—Hai Pham
(74) Attorney, Agent, or Firm—Withrow & Terranova PLLC (57) ABSTRACT

A laser-marking system that marks products by emitting a laser beam. A laser detection device in the laser-marking system determines whether a laser emitted a laser beam in proper relation to the product. If the laser detection device determines that the laser beam was not emitted in proper relation to the product, an error output signal is generated. The proper relation determination may, for example, be time based or count based. The error output signal may be communicated to a controller, such as a central controller or a programmable logic controller. The controller may shut down operation of the assembly line, shut down the laser-marking system, and/or may alter such systems as desired. The error output signal may also be communicated to a customer interface and/or to a remote location.

99 Claims, 9 Drawing Sheets

| CLOCK CYCLE | PRODUCT INDICATOR SENSOR SIGNAL (19) | COUNTER $C_2$ | J-K FLIP-FLOP (52) | | | |
|---|---|---|---|---|---|---|
| | | | J | K | CLOCK | Q(46) |
| 1 | 1 | 0 | 1 | 0 | 0 | 0 |
| 2 | 1 | 0 | 1 | 0 | 0 | 0 |
| 4 | 1 | 1 | 1 | 0 | 0 | 1 |

DEVICE AND METHOD FOR MONITORING A LASER-MARKING DEVICE

FIELD OF THE INVENTION

The present invention relates to laser marking systems that place markings onto products by emitting a laser beam.

BACKGROUND OF THE INVENTION

Marking systems are used to place informative markings on products, typically during their manufacture and/or distribution. Informative markings include useful information about the product; for example, an expiration date, "born-on" date or date of manufacture, lot number, place of manufacture, and the like.

Laser-marking systems use a laser to place informative markings on products. A laser emits a laser beam that is directed to the product to etch informative markings onto the product. The laser beam may etch the surface of the product or a coating placed on the product beforehand. At times, laser-marking technology has certain advantages over other marking technologies, e.g., ink jet printing technology. For example, the maintenance of a laser equipment may be easier and more economical in certain circumstances than the maintenance of other types of markers. Since the laser marking technology does not depend on the use of an ink in a liquid state to produce a mark, it is less prone to printing problems caused by ink.

In addition, laser-marking technology allows marking of substrates at extremely high speeds. An example of the use of this technology is in the marking of expiration dates on plastic soda bottles. During laser marking, the rate of movement of the conveyor carrying the soda bottles generally ranges from about 100 to 300 feet per minute, and it can be as high as 500 feet per minute.

It is important that laser-marking systems place informative markings onto products with a high rate of reliability. If products are not marked properly, such products may leave manufacturing and/or distribution facilities without the desired informative markings. When products moving at high speeds on an assembly line are marked, a product indicator may be used to detect the products as they pass in front of a marking laser. The laser emits a laser beam in response to a signal generated by the product indicator so that the laser beam is automatically emitted so as to precisely mark each product.

Occasionally, the marking laser may fail to emit a laser beam due to a malfunction or other problem. For example, the laser may have a dirty lens or other object blocking the laser beam path. However, in the event of such failure, the product indicator continues to detect products and trigger the laser to emit a laser beam. Absent some countermeasure, the laser-marking system will not detect a laser that is failing to emit a laser beam and mark products, and products will continue to move past the laser-marking system on the assembly line, potentially leaving the manufacturing and/or distribution facilities without the desired informative markings.

SUMMARY OF THE INVENTION

The present invention relates to a laser-marking device and system that determines if a laser beam has been emitted in proper relation to a detected product. A product indicator produces a signal when it either detects a product in proximity to a marking laser or is expecting a product to be in proximity to a marking laser. The marking laser emits a laser beam to place informative markings onto the product in response to this signal. A laser beam detector is placed in range of the laser beam to detect if the laser beam was emitted in proper relation to a signal from the product indicator. If the laser beam was not emitted in proper relation to the signal from the product indicator, an error output signal is generated.

In one laser beam detector embodiment, the laser beam detector is a thermal sensor that detects a temperature change (i.e. the presence or absence of heat). The thermal sensor is placed in proximity to the laser beam emitted by the laser-marking device.

In a second laser beam detector embodiment, the laser beam detector is comprised of an infrared emitter and detector. The infrared emitter and detector are placed on opposites sides of the laser beam path. If the infrared signal is passed through a laser beam, the infrared detector can detect a change in the infrared signal and generate a laser beam detection signal in response thereto. As one of ordinary skill in the art will appreciate, this embodiment may also be implemented by using a combination infrared emitter and detector wherein the emitter and detector reside in the same structure located on one side of the laser beam path.

In a third laser beam detector embodiment, the laser beam detector is a laser detector. The laser beam detector is placed in the expected path of the laser beam. Laser detector generates a laser beam detection signal in response thereto.

In a fourth laser beam detector embodiment, the laser beam detector is a thermocouple device. The thermocouple device is a thermocouple attached to a glass window placed in the expected path of the laser beam. The thermocouple detects a change in heat of the glass window as the laser beam passes through the window and generates a laser beam detection signal in response thereto.

In a fifth laser beam detector embodiment, the laser beam detector is a sonic emitter and detector. The sonic emitter and detector are placed in the path of the laser beam, and the sonic emitter emits sounds waves towards the detector. The sonic detector can detect whether sound waves passed through the laser beam, and in response generate a laser beam detection signal.

A controller may be provided to determine if a laser has emitted a laser beam in proper relation to a product. The controller may include electronic circuitry, a microcontroller, or a microprocessor. The controller may also include memory, counters, and/or timers.

In one controller embodiment, a product indicator emits a product indication signal. A counter counts the product indication signals received and outputs the count into a flip-flop. The laser beam detector emits a laser beam detection signal when the laser beam is detected. If more than a selected amount of products are detected by the product indication signal without the laser beam detection signal resetting the counter and/or flip-flop, the flip-flop changes states and emits an error output signal to signify that the laser beam did not mark a product.

In a second controller embodiment, the product indication signal and laser beam detection signal are input into a first and second counter in the controller, respectively. The first counter counts the number of products detected, and the second counter counts the number of laser beams emitted by the laser. A microprocessor in the controller compares the first counter and the second counter. If the values of the first and second counters differ by more than a threshold amount, the microprocessor generates an error output signal to signify that the laser beam did not mark a product(s).

In a third controller embodiment, a microprocessor in the controller uses a timer to record the time of receipt of both the product indication signal and the laser beam detection signal. The microprocessor determines if the time between the receipt of the product indication signal and the laser beam detection signal is greater than a threshold time value. If the time difference is greater than a threshold time value, the microprocessor generates an error output signal to signify that the laser beam did not mark a product(s).

The laser beam detection signal may also be coupled to a customer interface. The error output signal may also be coupled to a customer interface. The customer interface may include a counter to count the number of laser beam detection signals received. The value of this counter indicates the number of products marked with informative markings by the laser.

Alternatively, the product indication signal and the error output signal may also be coupled to a customer interface. The customer interface may include a counter to count the number of product indication signals received. The value of this counter indicates the number of products marked with informative markings by the laser, provided an error output signal is not received by the customer interface. The customer interface may also subtract the count of the error output signal counter from the count of the product indication signal counter to determine the number of products marked with informative markings by the laser.

The error output signal may also be coupled to (1) a central controller that operates an assembly line transporting products through the laser-marking system and/or (2) the laser-marking system itself. If the central controller receives an error output signal, the central controller may stop the assembly line, stop the laser-marking system, alter the operation of either the assembly line or the laser-marking system, generate an alarm condition, and/or communicate the error output signal over a network to a remote system.

After the detection of an error output signal, the customer interface and/or central controller may also be designed to restart the assembly line after a reset indicator, located at the customer interface or at a remote location, is activated either manually by a user, in response to another system, and/or on the next valid laser-marking made onto a product.

DETAILED DESCRIPTION OF THE INVENTION

The present invention relates to a device, system, and method for monitoring a laser beam that is used to place informative markings on products. Such informative markings may be placed on products during their manufacture and/or distribution. Informative markings may include any useful information concerning the product, including but not limited to, expiration date, "born-on" date or date of manufacture, lot number, and any other product information desired.

Figure 1:
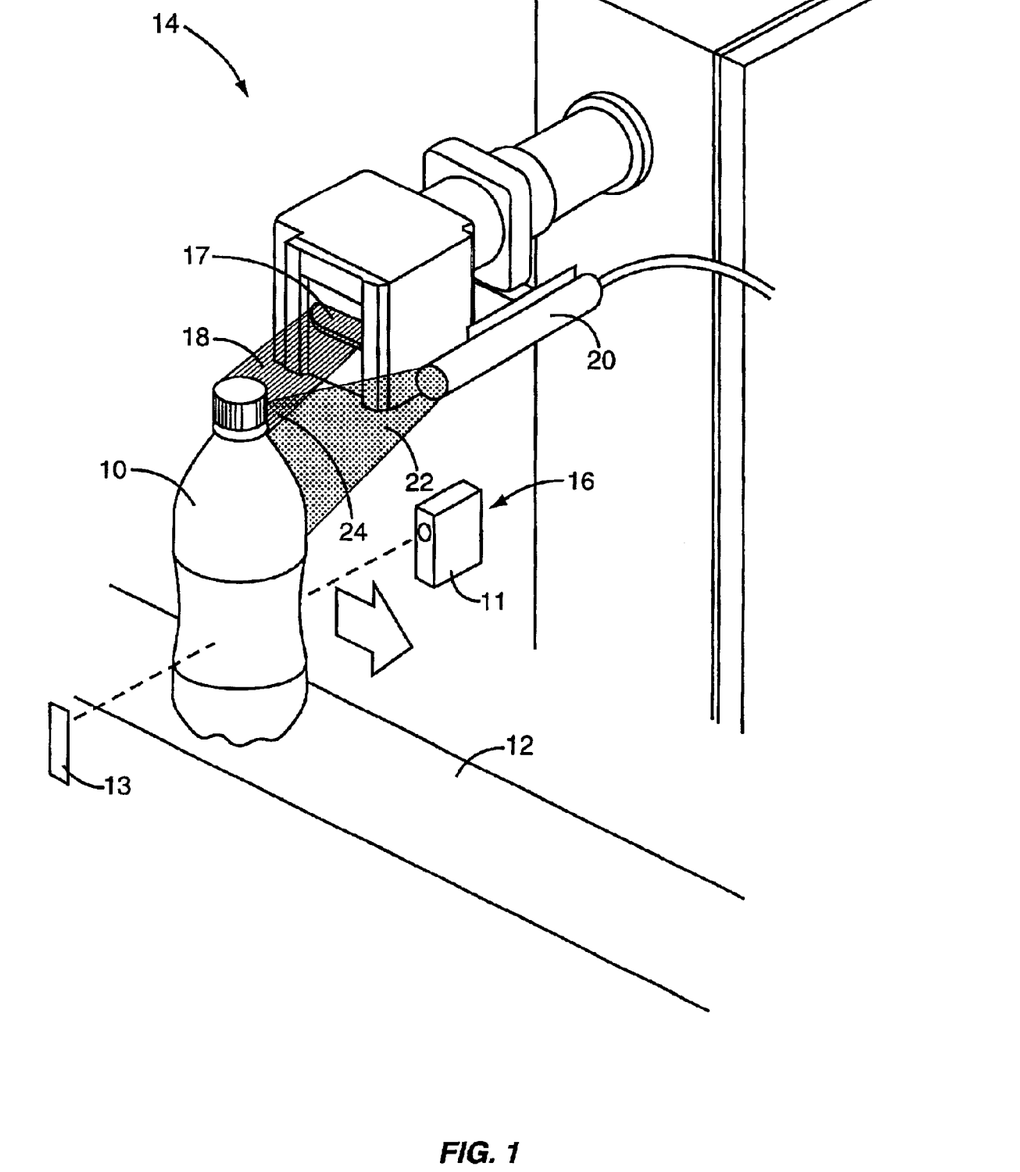
FIG. 1 is a schematic diagram of a laser-marking station.

FIG. 1 illustrates products 10 that are transported on an assembly line 12. A laser-marking station 14 is provided at a desired point on assembly line 12 where marking of products 10 is desired. A product indicator 16 detects the presence of product 10 as it begins to pass in front of laser-marking station 14. In this specific embodiment, product indicator 16 is comprised of an emitter 11 and a detector 13.

A laser 17 emits a laser beam 18 in response to product indication signal 19 (shown in FIG. 4), generated by product indicator 16, to place informative markings on product 10. Laser-marking station 14 also includes a laser beam detector 20 that is placed proximate to the path of laser beam 18. Laser beam detector 20 detects whether laser 17 emitted laser beam 18 so that a laser detection device 40 (shown in FIG. 4) may determine whether laser beam 18 was emitted onto product 10 in proper relation to the detection of product 10. Laser beam detector 20 may have a field of view 22 that detects all or an intersected portion 24 of laser beam 18.

In its broadest sense, "in proper relation" simply means that there is a correlation between a detected product 10 and the emission of laser beam 18. A laser 17 emits a laser beam 18 onto product 10 as product 10 is detected by product indicator 16. In particular, laser-marking station 14 causes laser 17 to emit laser beam 18 in response to detection of product 10 by product indicator 16. If laser beam 18 is emitted onto product 10 in proper relation to detection of product 10, there is a substantial likelihood that informative markings are placed on product 10 since there is a substantial likelihood that laser beam 18 struck product 10. The present invention is capable of determining whether or not laser beam 18 has been emitted in relation to each detected product 10, so that laser-marking station 14 can take any appropriate actions desired to ensure that laser beam 18 is emitted onto products 10 as products 10 are detected. Such determination may be accomplished by counting detected products 10 in relation to detected laser beam 18 emissions, or errors generated by laser marking station 14. Timings of detected product 10 and detected laser beam 18 may also be used for such determination.

Product indicator 16 may be any type of sensor that can detect the physical presence of an object, such as product 10, as it moves in front of laser-marking station 14. Product indicator 16 emits a product indication signal 19 when product 10 is detected. Product indicator 16 may be a proximity sensor, including but not limited to the proximity sensors discussed in U.S. Pat. Nos. 5,675,173; 5,877,664; 5,880,538, all of which are incorporated herein by reference in their entirety. Product indicator 16 may be an infrared emitter 11 and detector 13, as illustrated in FIG. 1 and discussed in U.S. Pat. No. 5,675,150, entitled "Active IR intrusion sensor," incorporated herein by reference in its entirety. Product indicator 16 may be a sonic sensor that uses sound waves to detect product 10. Product indicator 16 may also include a switch that is activated upon detection of product 10.

In an alternative embodiment, product indicator 16 may be an indication of an expected time when product 10 is expected or predicted to be in front of the laser-marking station 14 rather than a physical detection device. For example, product indicator 16 may be a clock signal that is generated from the movement of assembly line 12 (e.g., an encoder). As assembly line 12 moves in front of laser-marking station 14, a mechanical device may be attached to assembly line 12 to generate electronic pulses at the movement rate of assembly line 12. Or a detection device may generate a signal or electronic pulses for every portion of a predetermined length assembly line 12 where a product 10 is expected on assembly line 12. Any type of indicator may be used for product indicator 16, and the present invention is not limited to any particular indicator or method of detecting product 10.

Laser 17 projects laser beam 18 through a system of optics (not shown) that typically includes lenses and masks. The optics are controlled by a control system (not shown) to direct laser beam 18 to the desired area on product 10 for marking. Laser beam 18 contacts product 10 at different locations, as directed by the optics and the control system, to produce the desired informative markings on product 10. Any type of laser 17, including a carbon dioxide laser or YAG laser, may be used with the present invention, and the present invention is not limited to any particular type of laser 17. U.S. Pat. No. 4,652,722, entitled "Laser marking apparatus," incorporated herein by reference in its entirety, discusses a particular laser 17 arrangement and laser-marking station 14 that may be used with the present invention if product indicator 16, laser beam detector 20, and a laser detection device 40 are additionally provided.

A coating material (not shown) may be placed on product 10 before marking, and the laser beam 18 may irradiate the coating material instead of the product 10. U.S. Pat. No. 5,294,774, entitled "Laser marking system," later reissued in U.S. Reissue Pat. No. RE35,446, both of which are incorporated herein by reference in their entirety, disclose different coating materials that may be placed on products 10 to be marked by laser 17.

Figure 2A:
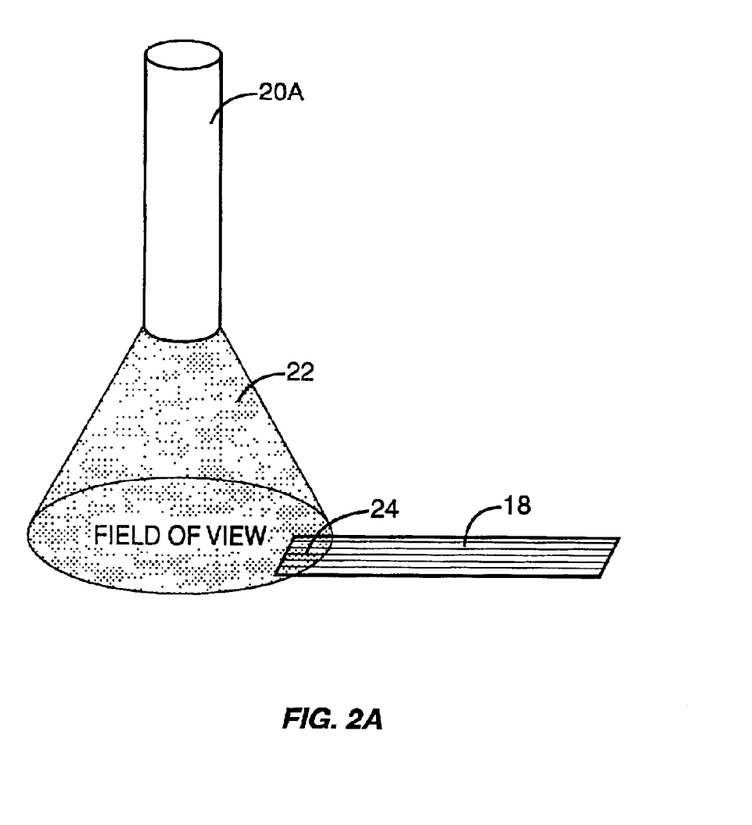
FIG. 2A is a schematic diagram of a thermal sensor and its field of view to detect temperature transitions.
Figure 2B:
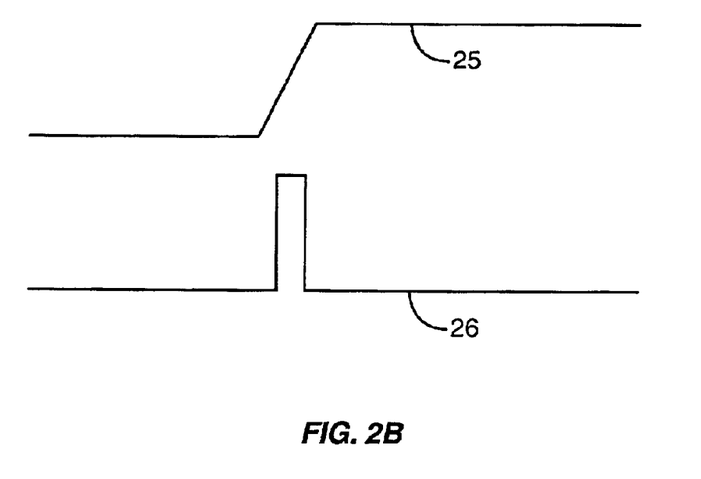
FIG. 2B is a schematic diagram of one thermal sensor temperature transition detection curve and related detection signal.

FIGS. 2 and 3 illustrate various types of laser beam detectors 20 that may be used with the present invention, and the present invention is not limited to any particular type or embodiment. FIG. 2A illustrates one type of laser beam detector 20 known as a thermal sensor 20A. A thermal sensor 20A detects transitions in temperature. A hot to cold or cold to hot transition may be detected depending on the particular type of thermal sensor 20A and its designed operation. Thermal sensor 20A has a field of view 22. As heat enters the field of view 22, thermal sensor 20A detects the heat from laser beam 18 and trigger an internal thermal switch. Because laser beam 18 generates heat, thermal sensor 20A can detect laser beam 18 if it enters in its field of view 22, including any intersected portion 24 of laser beam 18 and field of view 22. Thermal sensor 20A may be placed on laser-marking station 14 so that its field of view 22 is in the expected path of laser beam 18, or thermal sensor 20A may be placed proximate to product 10 in close proximity to where laser beam 18 is expected to hit product 10.

FIG. 2B illustrates a line graph of a temperature transition detected by thermal sensor 20A. A laser beam temperature line 25 indicates a detection of a cold to hot temperature transition by thermal sensor 20A when laser beam 18 is in the field of view 22. If the rate of change of temperature detected by thermal sensor 20A is "significant," thermal sensor 20A causes a trigger in the thermal switch, included in thermal sensor 20A, to output a switch indicated by the laser beam detection signal 26. The relevant "significant" change in temperature may be configured to be any amount of temperature desired, including small temperature change transitions depending on the type of thermal sensor 20A and its capabilities of detecting change in temperature.

Thermal sensor 20A may also be able to determine if laser 17 has lost power or has any attenuation preventing it from emitting a laser beam 18 at full strength. Laser 17 may have a blocked filter or lens or may have internal problems that cause laser beam 18 to be attenuated in either power or field of range. In either case, thermal sensor 20A may still detect a temperature change, but such temperature change may be less than expected for the particular laser 17 used in laser-marking station 14. In such a case, laser beam detector 20 may be able to generate a laser beam detection signal 26 that is indicative of such a condition.

In one thermal sensor 20A embodiment, thermal sensor 20A is manufactured by Exergen, Inc. under the name SnakeEye™. Descriptions of Snake Eye™ can be found at http://www.exergen.com/industrl/spdboost/slidesho/sld047.htm, http://www.exergen.com/industrl/slides/sld038.htm, and http://www.exergen.com/industrl/product/html/snakeyet.htm, all of which are incorporated herein by reference in their entirety.

Figure 3A:
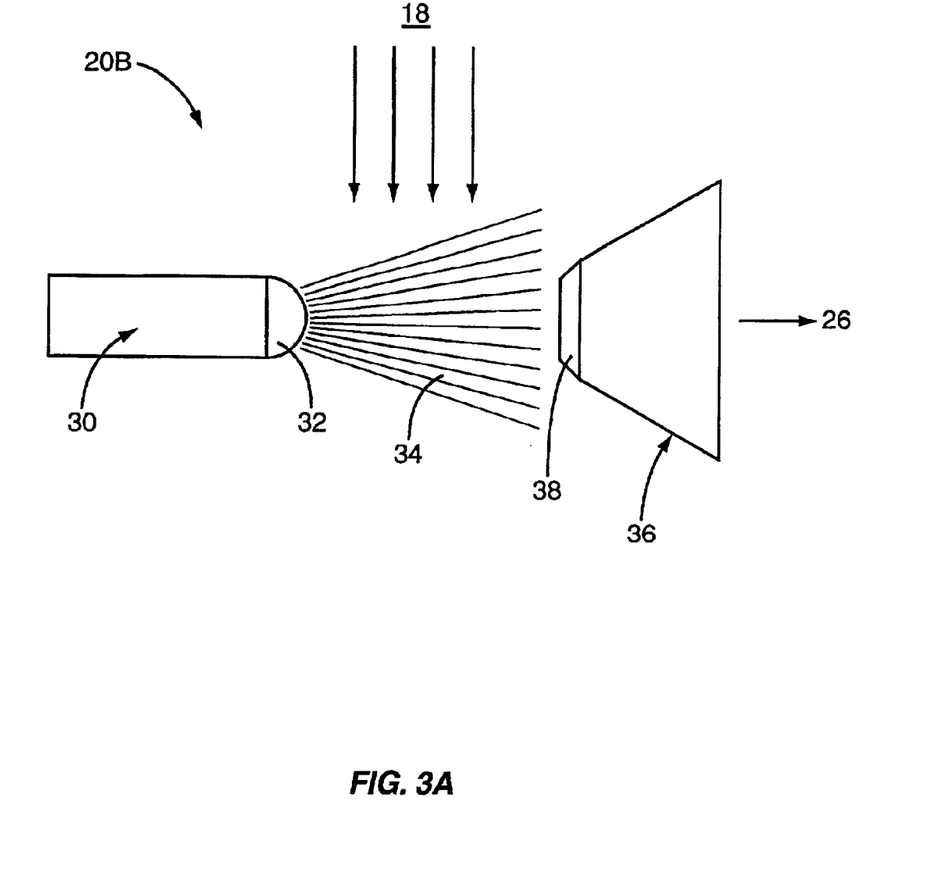
FIG. 3A is a schematic diagram of an infrared emitter and detector.

FIG. 3A illustrates another type of laser beam detector 20 known as an infrared emitter and detector 20B. Infrared emitter and detector 20B is comprised of an infrared emitter 30 and infrared detector 36. Infrared emitter 30 emits an infrared signal 34 through a transparent window 32 to the path of laser beam 18. Infrared detector 36 is located opposite to infrared emitter 30 to pick up infrared signal 34 emitted by infrared emitter 30. Infrared detector 36 also includes a transparent window 38 so that infrared signal 34 can penetrate and go into infrared detector 36. If laser beam 18 does not pass through the path of infrared signal 34, infrared detector 36 will detect an unaltered infrared signal 34. However, if laser beam 18 does pass through the path of infrared signal path 34, infrared detector 36 will detect a change or alteration in infrared signal 34. Infrared detector 36 may then emit a signal or other type of detection, in the form of a laser beam detection signal 26, to indicate that laser 17 emitted laser beam 18. An example of an infrared emitter and detector 20B that may be used with the present invention is discussed in U.S. Pat. No. 5,675,150, entitled "Active IR intrusion detector," previously incorporated herein by reference in its entirety.

Infrared emitter 30 may be a solid state or black body radiator. Infrared detector 36 may be a solid-state device of pyro-electric infrared (PIR) device. Note that the laser beam detector 20 may use an emitter and detector that emits and detects a different type of signals other than infrared. For example, the signal emitted and detected may be in the visible spectrum.

Further, one of ordinary skill in the art will appreciate that infrared emitter 30 and infrared detector 36 may be combined in the same structure (not shown). In such a configuration, infrared detector 36 detects the amount of infrared signal 34 emitted by infrared emitter 30 that is reflected back to the structure containing emitter 30 and detector 36. Similar to the above embodiment, detector 36 will detect an altered infrared signal 34 if laser beam 18 passes through the path of infrared signal 34.

Figure 3B:
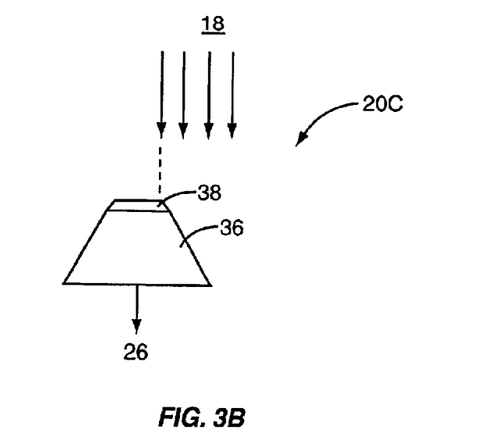
FIG. 3B is a schematic diagram of a laser detector.

FIG. 3B illustrates another type of laser beam detector 20 that comprises a laser detector 20C. Detector 20C directly detects the laser beam 18 emitted from laser 17. Detector 20C may be any type of detector that can detect a laser beam 18. In one embodiment, detector 20C is an infrared detector similar to the detector illustrated in FIG. 3A. Detector 20C may have a detector 36 that includes a transparent window 38 so that light from laser beam 18 may pass through transparent window 38 into detector 36. Detector 36 may then emit a signal or other type of indicator, in the form of a laser beam detection signal 26 to indicate that laser 17 emitted laser beam 18. Detector 20C may be placed anywhere proximate to assembly line 12 and/or products 10 so that laser beam 18 is directed in whole or part into detector 20C when laser beam 18 marks product 10.

Figure 3C:
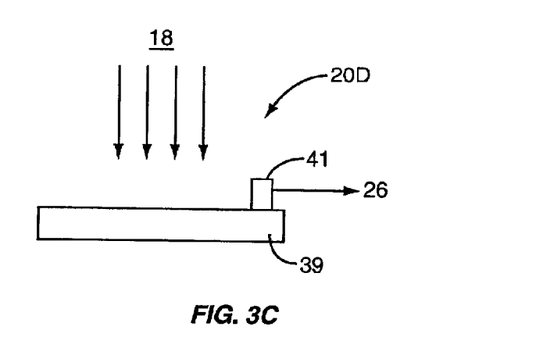
FIG. 3C is a schematic diagram of a thermocouple device.
Figure 3D:
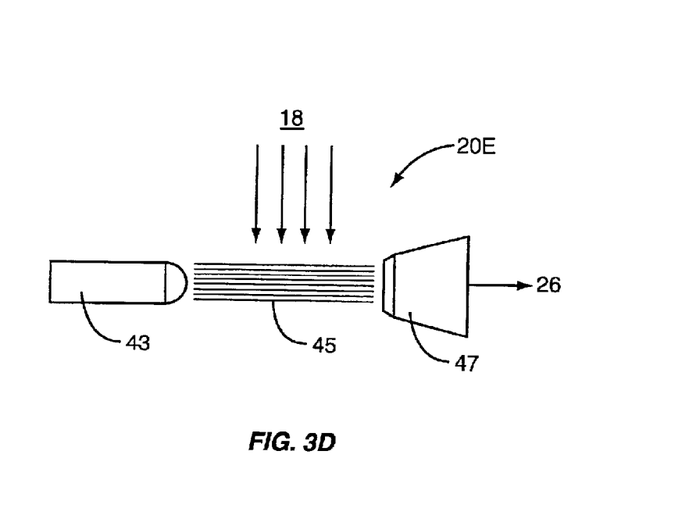
FIG. 3D is a schematic diagram of a sonic emitter and detector.

FIG. 3C illustrates another type of laser beam detector 20 known as a thermocouple device 20D. Thermocouple device 20D is comprised of a glass window 39 and a thermocouple sensor 41. Glass window 39 is placed in the path of laser beam 18 so that laser beam 18 will pass through glass window 39 on its way to marking a product 10. Theremocouple sensor 41 detects heat. When laser beam 18 passes through glass window 39, thermocouple sensor 41 detects the heat from laser beam 18 and emits a signal or other type of indicator in the form of a laser beam detection signal 26 to indicate that laser 17 emitted laser beam 18.

FIG. 3C illustrates another type of laser beam detector 20 known as a sonic emitter and detector 20E. Sonic emitter and detector 20E includes an emitter 43 that emits sound waves 45, and a detector 47 that picks up the sound waves. Sonic emitter and detector 20E are placed apart so that laser beam 18 passes through the sounds waves 45. If sound waves 45 are emitted by emitter 43 through ambient air, detector 47 will detect sound waves in one form. If sound waves are emitted by emitter 43 through the path of laser beam 18, detector 47 will detect sound waves 45 in a different form than when sound waves 45 pass through ambient air. The difference in form is detected and laser beam detection signal 26 is produced, to indicate that laser 17 emitted laser beam 18.

The present invention may use any type of laser beam detector 20 so long as it can detect if laser 17 emitted laser beam 18, either directly by sensing laser beam 18, or indirectly by sensing characteristics of the laser 17 (e.g., the presence of heat). The present invention is not limited to any particular type of laser beam detector 20.

Figure 4:
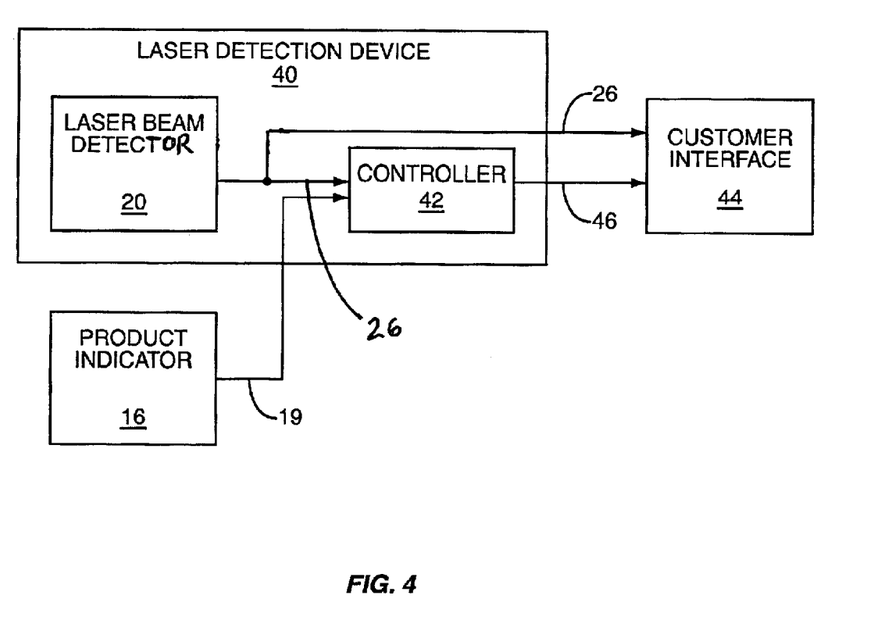
FIG. 4 is a schematic diagram of a laser detection device with product indicator and customer interface.

FIG. 4 illustrates one embodiment of a laser detection device 40. Laser detection device 40 determines if laser beam 18 was emitted onto product 10 in proper relation to product indicator 16. Laser detection device 40 is comprised of laser beam detector 20 and controller 42. Controller 42 may be comprised of basic electronic circuitry, more complex electronic circuitry, or even a micro-controller or microprocessor, whereby additional supporting hardware and/or software may be present.

In this embodiment, controller 42 accepts as input laser beam detection signal 26 from laser beam detector 20, and product indication signal 19 from product indicator 16. Controller 42 inputs may be optically isolated for each other. Controller 42 determines whether laser 17 emitted laser beam 18 in proper relation to product indication signal 19. If controller 42 determines that laser beam 18 was not emitted in proper relation to product indication signal 19, controller 42 emits an error output signal 46. Error output signal 46 can be used to perform various tasks. Controller 42 inputs and output may also be optically isolated from each other.

Error output signal 46 may also be used to indicate an error on a customer interface 44. Customer interface 44 can be any type of display, such as a Cathode Ray Tube (CRT) or Liquid Crystal Display (LCD), visual and/or audio alarm, or other visual and/or audio device to indicate the presence of error output signal 46.

Error output signal 46 may be used to signal a central controller (not shown) that controls the operation of assembly line 12 and/or laser-marking station 14. The central controller may be a programmable logic controller (PLC) or other control device or system. The central controller may control operation of assembly line 12, such as power to assembly line 12, and/or operation of laser-marking station 14. The central controller may shut down operation of assembly line 12 upon receiving an error output signal 46 until laser 17 is checked and/or repaired, if needed. The central controller may send a signal to another system at a remote location from assembly line 12 and laser-marking station 14 in the event that operation of assembly line 12 and/or laser-marking station 14 is monitored remotely.

Laser beam detection signal 26 may be used to count products 10 marked by laser beam 18. Laser beam detection signal 26 indicates the number of products 10 marked by laser beam 18. The total count of products 10 likely marked by laser beam 18 is the count of the number of laser beams 18 detected by laser beam detection signal 20. Thus, the laser beam detector 20 may be coupled to a counter to count the laser beam detection signals 26. Such counter may optionally be included in controller 42, in customer interface 44, or any other system that has laser beam detection signal 26 as an input.

Alternatively, the number of products 10 marked by laser beam 18 could be calculated using product indication signal 19. Controller 42 and/or customer interface 44 may subtract error output signal 46 from product indication signal 19 to represent the number of products 10 detected that were marked by laser beam 18. Controller 42 and/or customer interface 44 may use one or more counters to count the error output signal 46 and/or the product indication signal 19 to perform such calculation. Further, the necessary counters may be located in any other system that has product indication signal 19 and error output signal 46 as inputs.

Figure 5A:
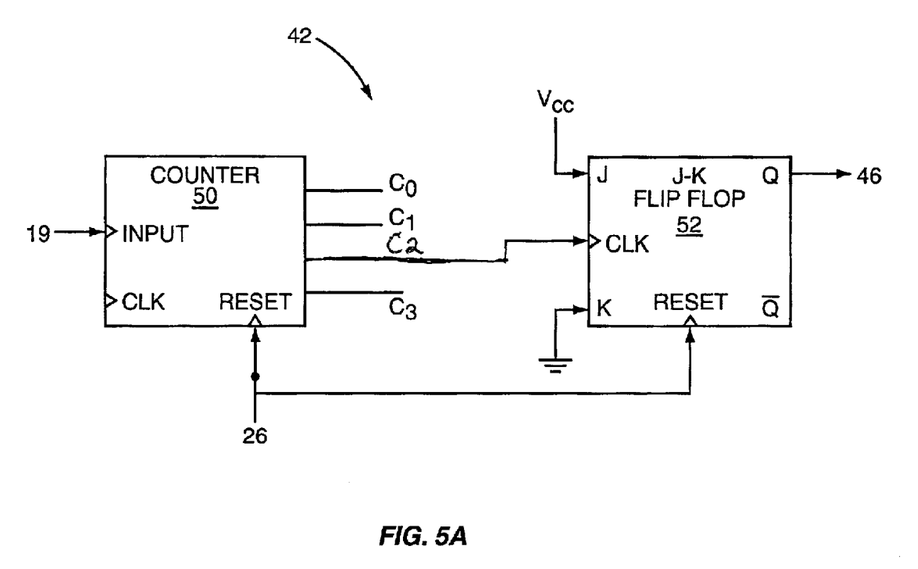
FIG. 5A is a schematic diagram of one controller embodiment comprising a counter and a J-K flip-flop.
Figure 5B:
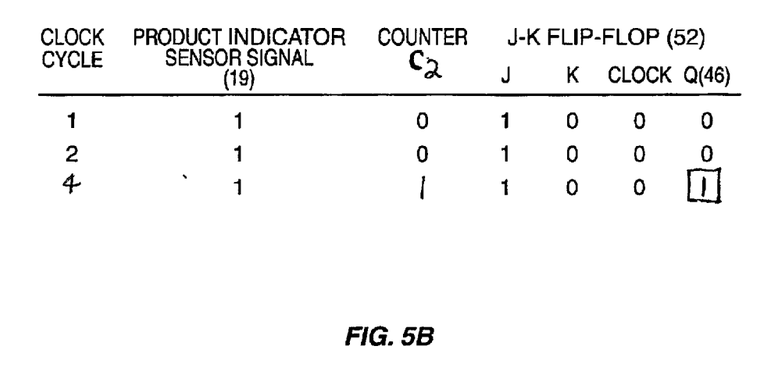
FIG. 5B is a truth table of the controller embodiment illustrated in FIG. 5A.

FIGS. 5A and 5B illustrate one embodiment of controller 42 that may be used with the present invention. Controller 42 is comprised of electronic circuitry, including a 4-bit binary counter 50, for a total of sixteen unique states, and a J-K flip-flop 52. Product indication signal 19 is coupled to an input on counter 50. Product indication signal 19 is an input signal that transitions from either high to low or low to high for every product 10 detected. Counter 50 transitions to a next counting state for each clock cycle that product indication signal 19 is present on the input of counter 50. If product indication signal 19 is present for subsequent clock signals without interruption, and/or without being reset, counter 50 will continue to transition count states such that, for example, Vcc or "1" is present on C1, C2 on the second cycle, C3 on the fourth clock cycle, and C4 on the eighth clock cycle. Once counter 50 reaches its sixteenth state, in which C0, C1, C2, and C3 are all Vcc or "1", counter 50 begins again at the first state wherein C0 is Vcc or "1."

In this particular embodiment, counter 50 is capable of counting sequentially in sixteen different states until reset.

The C2 line of counter 50 is coupled to a clock on J-K flip-flop 52. Note that the circuit illustrated in FIG. 5A may include user-selectable jumper connections for the connection of any C line to the clock input on J-K flip-flop 52, including C0, C1, C2, and C3. The J input is coupled to Vcc or "1," and the K input is coupled to ground, or "0," so that J input and K input are always high (Vcc or "1") and low (ground or "0"), respectively. Output Q is the port that outputs a state change in J-K flip-fop 52. Laser beam detection signal 26 is coupled to the reset of counter 50 and optionally to the reset of J-K flip-flop 52. Every time product indication signal 19 is received in proper relation to laser beam detection signal 26, counter 50 and J-K flip-flop 52 (if laser beam detection signal 26 is coupled to the reset of J-K flip-flop 52) are reset so that counter 50 and J-K flip-flop 52 never transition to their next state. J-K flip-flop 52, when reset, is in a zero state transition for output Q. The reset of counter 50 and/or J-K flip-flop 52 may be controlled by a manually activated switch so that counting does not begin again until desired. For example, error output signal 46 may stop assembly line 12, and the counting should not be restarted until the assembly line 12 is once again operational.

In the illustrated embodiment, if product indication signal 19 is received in four consecutive clock cycles without counter 50 and/or JK flip-flop 52 being reset by laser beam detection signal 26, C2 will become Vcc or "1" on the fourth product indication signal 19 received. Vcc or "1" present on C2 causes J-K flip-flop 52 to transition to the next state, thereby causing output Q to become a "1" or Vcc. Output Q is coupled to error output signal 46.

FIG. 5B illustrates a chronological truth table for the circuit configuration illustrated in FIG. 5A for four consecutive clock cycles where product 10 is detected, but the laser beam 18 is not detected. The product indication signal is "1" for each clock cycle 1–4. C2 of counter 50 is "1" when the fourth product indication signal 19 received. J input on J-K flip-flop 52 is always "1." K input on J-K flip-flop 52 is always "0." When C2 is "1," on the fourth clock cycle, J-K flip-flop 52 is clocked and transitions to the next state. Q output of J-K flip-flop 52 transitions from a "0" to a "1," thereby causing error output signal 46 to indicate an error.

Please note that the circuit illustrated in FIG. 5A can be configured to generate error output signal 46 after one or more consecutive laser beam detection signals 26 are not received in proper relation to product indication signal 19. For example, C1 would be used to input into the clock of J-K flip-flop 52 if error output signal 46 where to be generated after two consecutive laser beam detection signals 26 were not received in proper relation to product indication signal 19. A different type of flip-flop, such as an S-R or D flip-flop, may be used with the present invention. The present invention is not limited to a laser beam 18 being detected in proper relation to any particular number of consecutive products 10.

Figure 6:
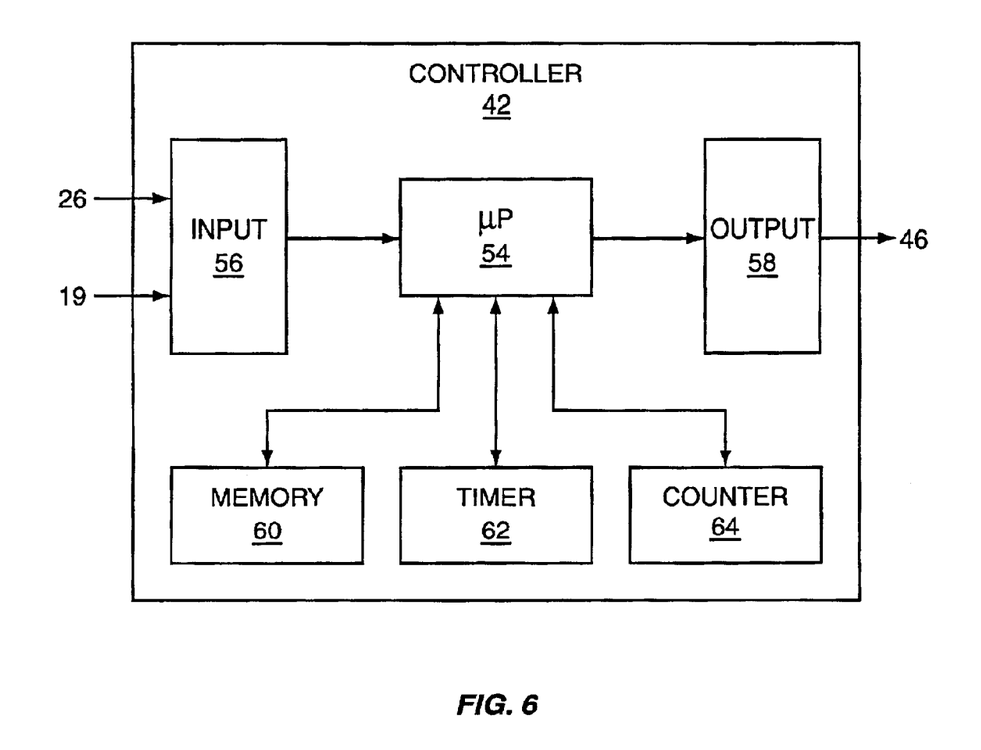
FIG. 6 is a schematic diagram of another controller embodiment comprising a microprocessor, memory, timer, and counter.

FIG. 6 illustrates another embodiment of controller 42. In this embodiment, controller 42 comprises more complex circuitry that includes a microprocessor 54. Controller 42 includes an input buffer 56 and an output buffer 58. Laser beam detection signal 26 and product indication signal 19 are received by input buffer 56. Input buffer 56 passes such signals to microprocessor 54. Microprocessor 54 is coupled to output buffer 58 to generate error output signal 46 when laser 17 does not emit laser beam 18 in proper relation to product indication signal 19. Controller 42 also includes memory 60, timer 62 and/or counter 64 that are all coupled to microprocessor 54. Two counters 64A, 64B (not shown) may optionally be provided to count both product indication signal 19 and laser beam detection signal 26.

Figure 7:
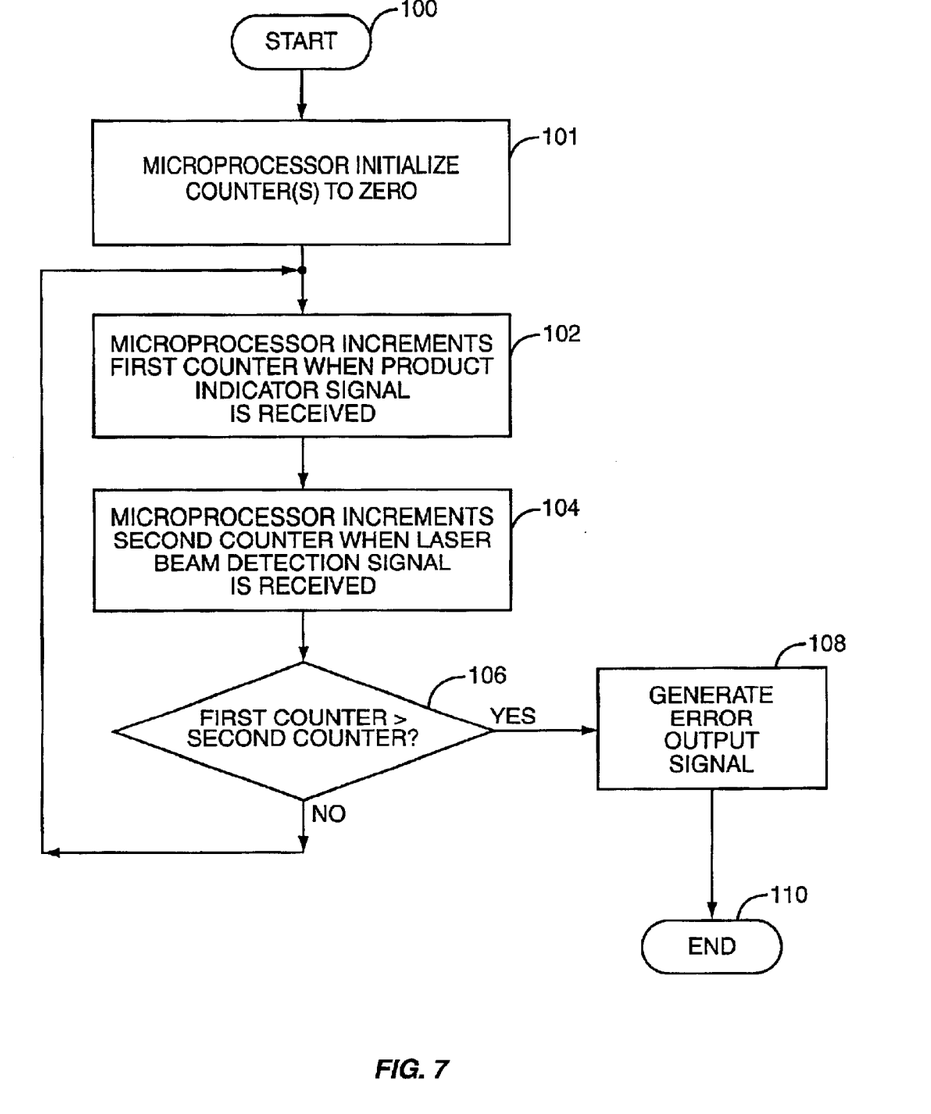
FIG. 7 is a flowchart illustrating a technique to determine if a laser emitted a laser beam in proper relation to detection of a product.

FIG. 7 illustrates a process flowchart of one embodiment of controller 42 of FIG. 6. The process starts (block 100) and microprocessor 54 initializes counter(s) 64 to zero (block 101). Microprocessor 54 increments first counter 64A (not shown) when product indication signal 19 is received through input buffer 56 (block 102). Microprocessor 54 increments second counter 64B (not shown) when a laser beam detection signal 26 is received through input buffer 56 (block 104). Microprocessor 54 compares the value of first counter 64A to the value of second counter 64B (decision 106). If the value of first counter 64A is greater than the value of second counter 64B by more than a threshold value, microprocessor 54 generates error output signal 46 through output buffer 58 (block 108), and the process ends (block 110). If the value of first counter 64A is not greater than the value of second counter 64B by a certain threshold value, the process continues by returning to block 102.

The threshold value may be a count of one or greater. The threshold value is the number of products 10 that are not in proper relation to laser beam 18 emissions that may be detected by controller 42 before error output signal 46 is generated. The threshold value may be stored in memory 60 or may be provided through use of circuitry, such as the jumper configuration previously discussed.

Figure 8:
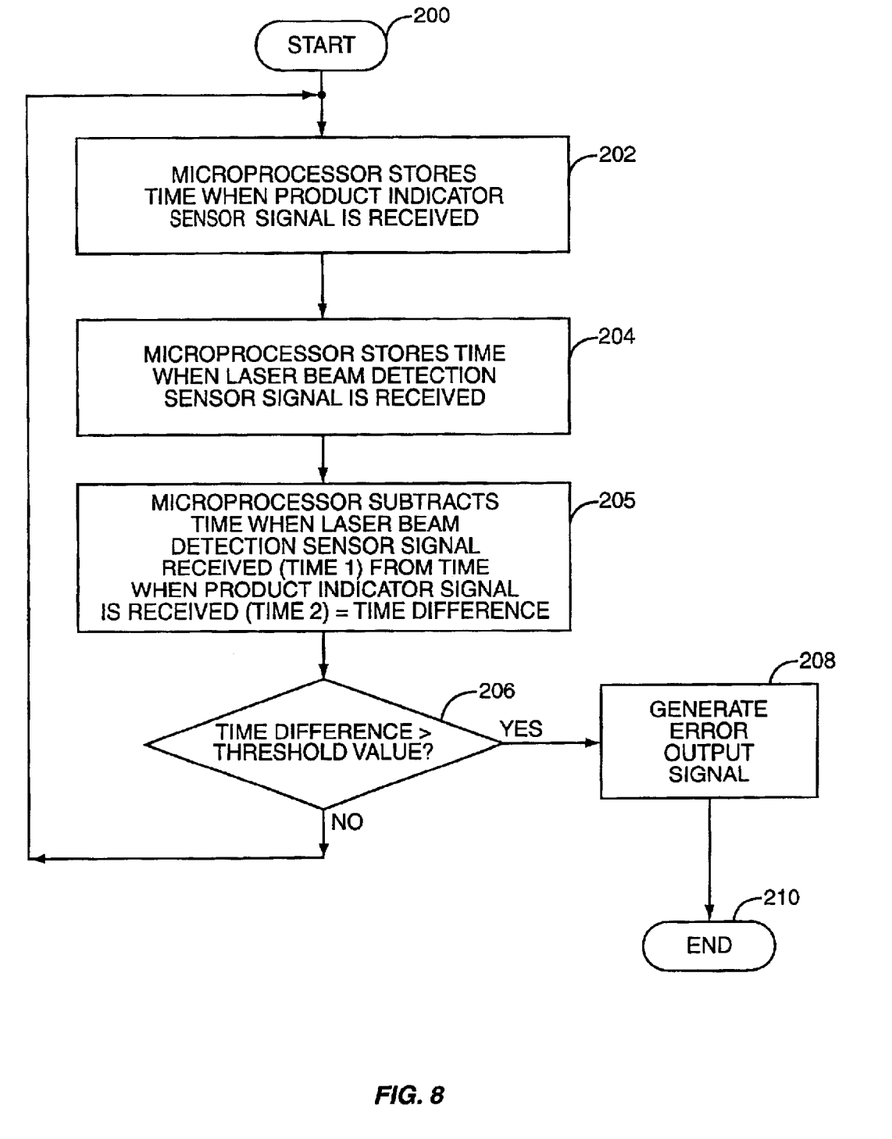
FIG. 8 is a flowchart illustrating another technique to determine if a laser emitted a laser beam in proper relation to detection of a product.

FIG. 8 illustrates another flowchart of a possible operation of controller 42 of FIG. 6. The process starts (200), and microprocessor 54 uses timer 62 to store the time (Time 1) when product indication signal 19 is received from input buffer 56 (block 202). Microprocessor 54 also uses timer 62 to store the time (Time 2) 20 when laser beam detection signal 26 is received from input buffer 56 (block 204). Microprocessor 54 subtracts Time 1 from Time 2 to obtain a time difference (block 205) and then determines if this time difference value is greater than a threshold value (decision 206). If so, microprocessor 54 generates error output signal 46 through output buffer 58 (block 208), and the process ends (block 210). If the threshold value is not exceeded, the process continues by returning to block 202.

The threshold time may be in nanoseconds, microseconds, milliseconds, or seconds depending on the speed of assembly line 12 and the rate at which products 10 pass laser-marking station 14. The threshold time may be stored in memory 60 or through use of circuitry, such as a jumper configuration. For example, a typical threshold time may be as low as around about 50 milliseconds and as high as around about 1 second, depending on the speed at which products 10 are transported on assembly line 12.

Certain modifications and improvements will occur to those skilled in the art upon a reading of the foregoing description. It should be understood that the present invention is not limited to any particular type of product 10, laser-marking station 14, product indicator 16, laser 17, laser beam detector 20, controller 42, or particular electronic circuitry comprising controller 42, type of counter 50 and flip-flop 52, threshold number of products 10 detected without detection of laser beam 18, and threshold amount of time between detection of products 10 and detection of laser beam 18. In addition, it should be understood that for purposes of this invention as described herein, couple or coupled includes connected, whether directly connected or connected through some other form, such as wireless communication, infrared, and optical signaling, or reactively coupled, whether by capacitance or inductance.

One of ordinary skill in the art will recognize that there are different manners in which the elements discussed above can be configured to operate to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A laser detection device that is responsive to a product indication signal to determine if a laser has emitted a laser beam towards a product, comprising:
   a laser beam detector that generates a laser beam detection signal in response to the laser emitting the laser beam;
   a controller that accepts as inputs the product indication signal and said laser beam detection signal wherein said controller emit an error output signal if the laser beam emitted by the laser is not in proper relation to the product indication signal; and
   a customer interface that accepts as input one or more of the following signals; said leaser beam detection signal, the product indication signal, or said error output signal.

2. The laser detection device of claim 1, wherein said laser beam detector comprises aithermal sensor.

3. The laser detection device of claim 2, wherein said thermal sensor further comprises a thermal switch.

4. The laser detection device of claim 2, wherein said thermal sensor is configured to detect a hot to cold temperature transition.

5. The laser detection device of claim 2, wherein said thermal sensor is configured to detect a cold to hot temperature transition.

6. The laser detection device of claim 1, wherein said laser beam detector comprises optical emitter and detector.

7. The laser detection device of claim 6, wherein said optical emitter emits an infrared spectrum.

8. The laser detection device of claim 7, wherein the infrared spectrum is emitted through a transparent window on said optical emitter.

9. The laser detection device of claim 7, wherein the emitted infrared spectrum is received through a transparent window on said optical detector.

10. The laser detection device of claim 1, wherein said laser beam detector is optical detector.

11. The laser detection device of claim 1, wherein said laser beam detector is comprise of a thermocouple.

12. The laser detection device of claim 11, wherein said thermocouple is coupled to a transparent material wherein said law beam passes through said transparent material and causes thermocouple to detect a change in heat.

13. The laser detection device of claim 1, wherein said laser beam detector is comprised of a sonic emitter and detector.

14. The laser detection device of claim 1, wherein said inputs to said controller are optically isolated.

15. The laser detection device of claim 1, wherein said error output signal is optically isolated from said inputs to said controller.

16. The laser detection device of claim 1, wherein said controller comprises a counter that is responsive to the product indication signal to count the number product likely marked by said laser beam.

17. The laser detection device of claim 16, wherein said counter is coupled to the clock of a flip-flop, and wherein the product indication signal increments said counter and said laser beam detection signal resets said flip-flop, and wherein said flip-flop generates said error output signal if said flip-flop changes state.

18. The laser detection device of claim 17, wherein said flip-flop is comprised from the group consisting of a J-K flip-flop and a R-S flip-flop.

19. The laser detection device of claim 16, wherein said controller further comprises a second counter that is responsive to said laser beam detection signal.

20. The laser detection device of claim 19, wherein said controller generates said error output signal if said first counter and said second counter differ by more than a threshold count.

21. The laser detection device of claim 20, wherein said threshold count is 4.

22. The laser detection device of claim 20, wherein said threshold count is configurable.

23. The laser detection device of claim 19, wherein said first and second counters are clocks wherein said controller measures the time difference between the value in said first counter and said second counter and generates said error output signal if said time difference is greater than a threshold time.

24. The laser detection device of claim 23, wherein said threshold time is between around about 50 milliseconds and around about 1 second.

25. The laser detection device of claim 23, wherein said threshold time is configurable.

26. The laser detection device of claim 1, wherein said product indication signal comprises a product indicator sensor that is capable of physically detecting the product.

27. The laser detection device of claim 1, wherein said product indication signal comprises a signal indicative of the movement speed of the products.

28. The laser detection device of claim 27, wherein said product indication signal is a clock signal generated in relation to the speed of movement of said products.

29. The laser detection device of claim 1, wherein said controller detects if said laser beam signal is attenuated.

30. The laser detection device of claim 1, wherein said laser beam detection signal indicates an attenuation of said laser beam.

31. The laser detection device of claim 1, wherein said customer interface comprises a counter that is responsive to the product indication signal to count the number of products likely marked by said laser beam.

32. The device of claim 31, wherein said customer interface displays said counter that is responsive to the product indication signal.

33. The device of claim 1, wherein said custom interface accepts as input said error output signal.

34. The device of claim 33, wherein said customer interface comprises a counter that is responsive to said error output signal to count the number of products not likely marked by said laser beam.

35. The device of claim 34, wherein said customer interface displays said counter that is responsive to said error output signal.

36. The device of claim 34, wherein said customer interface also accepts as input the product indication signal.

37. The device of claim 36, wherein said customer interface comprises a counter that is responsive to the product indication signal to count the number of products likely marked by said laser beam.

38. The device of claim 37, wherein said customer interface subtracts said counter that is responsive to the product indication signal from said counter that is responsive to said error output signal to form a count of the number of products marked by said laser beam.

39. The device of claim 38, wherein said customer interface displays said count of the number of products marked by said laser beam.

40. A laser detection system for marking a product with a laser emitting a laser beam comprising:
- a product indicator that produces a product indication signal when the product is detected and causes the laser to emit the laser beam onto the product;
- a laser beam detector that generates a laser beam detection signal in response to said laser beam;
- a controller that accepts as inputs said product indication signal and said laser beam detection signal wherein said controller emits an error output signal if the laser beam emitted by the laser is not in proper relation to said product indication signal; and
- a customer interface that accents as input one or more of the following signals; said laser beam detection signal, said product indication signal, or said error output signal.

41. The laser detection system of claim 40, wherein said laser beam detector comprises a thermal sensor.

42. The laser detection system of claim 41, wherein said thermal sensor further comprises a thermal switch.

43. The laser detection system of claim 41, wherein said thermal sensor is configured to detect a hot to cold temperature transition.

44. The laser detection system of claim 41, wherein said thermal sensor is configured to detect cold to hot temperature transition.

45. The laser detection system of claim 40, wherein said laser beam detector comprises an optical emitter and detector.

46. The laser detection system of claim 45, wherein said optical emitter emits an infrared spectrum.

47. The laser detection system of claim 46, wherein the infrared spectrum is emitted through a transparent window on said optical emitter.

48. The laser detection system of claim 46, wherein the infrared spectrum is received through a transparent window on said optical detector.

49. The laser detection system of claim 40, wherein said laser beam detector comprises an optical detector.

50. The laser detection system of claim 40, wherein said laser beam detector comprises a thermocouple.

51. The laser detection system of claim 50, wherein said thermocouple is coupled to a transparent material wherein said laser beam passes through said transparent material and causes thermocouple to detect a change in heat.

52. The laser detection system of claim 40, wherein said laser beam detector comprises a sonic emitter and detector.

53. The laser detection system of claim 40, wherein said inputs to said controller are optically isolated.

54. The laser detection system of claim 40, whrein said error output signal is communicated to a customer interface.

55. The laser detection system of claim 40, wherein said error output signal is communicated to an assembly line controller that controls the transport of the products.

56. The laser detection system of claim 55, wherein said assembly line controller stops the transport of products upon receipt of said error output signal.

57. The laser detection system of claim 55, wherein said assembly line controller communicates an alarm to a remote system when said error output signal is received.

58. The laser detection system of claim 40, wherein said error output signal is optically isolated from said inputs to said controller.

59. The laser detection system of claim 40, wherein said controller comprises a counter that is responsive to said product indication signal to count the number of products likely marked by said laser beam.

60. The laser detection system of claim 59, wherein said counter is coupled to the clocks of a flip-flop, and wherein said product indication signal increments said counter and said laser beam detection signal resets said flip-flop, and wherein said flip-flop generates said error output signal if said flip-flop changes state.

61. The laser detection system of claim 60, wherein said flip-flop is comprised from the group consisting of a J-K flip-flop, a R-S flip-flop, and a D flip-flop.

62. The laser detection system of claim 59, wherein said controller further comprises a second counter that is responsive to said laser beam detection signal.

63. The laser detection system of claim 62, wherein said controller generates said error output signal if said first counter and said second counter differ by more than a threshold count.

64. The laser detection system of claim 63, wherein said threshold count is 4.

65. The laser detection system of claim 63, wherein said threshold count is configurable.

66. The laser detection system of claim 62, wherein said first and second counters are clocks wherein said controller measures the time difference between said first counter and said second counter and generates said error output signal if said time difference is greater than a threshold time.

67. The laser detection system of claim 66, wherein said threshold time is between around about 50 milliseconds to around about 1 second.

68. The laser detection system of claim 66, wherein said threshold time is configurable.

69. The laser detection system of claim 59, wherein said error output signal is communicated to a counter inside said customer interface.

70. The laser detection system of claim 69, wherein said customer interface is coupled to a central controller.

71. The system of claim 40, wherein said customer interface comprises a counter that is responsive to said product indication signal to count the number of products likely marked by said laser beam.

72. The system of claim 71, wherein said customer interface displays said counter that is responsive to said product indication signal.

73. The system of claim 40, wherein said customer interface accepts as input said error output signal.

74. The system of claim 73, wherein said customer interface comprises a counter that is responsive to said error output signal to count the number of products not likely marked by said laser beam.

75. The system of claim 74, wherein said customer interface displays said counter that is responsive to said error output signal.

76. The system of claim 74, wherein said customer interface also accepts as input said product indication signal.

77. The system of claim 76, wherein said customer interface comprises a counter that is responsive to the product indication signal to count the number of products likely marked by said laser beam.

78. The system of claim 77, wherein said customer interface subtracts said counter that is responsive to the product indication signal from said counter that is responsive to said error output signal to form a count of the number of products marked by said laser beam.

79. The device of claim 78, wherein said customer interface displays said count of the number of products marked by said laser beam.

80. A laser detection system for marking a product, comprising:

a product indicator that produces a product indication signal when the product is detected;

a laser that emits a laser beam onto the product in response to said product indication signal;

a laser detector that generates a laser beam detection signal in response to said laser beam;

a controller that accepts as inputs said product indication signal and said laser beam detection signal wherein said controller emits an error output signal if the laser beam emitted by said laser is not in proper relation to said product indication signal; and a customer interface that accepts as input one or more of the following signals; said laser beam detection signal, said product indication signal, or said error output signal.

81. A method for detecting if a marking laser has emitted a laser beam towards a product, comprising:

generating a product indication signal when the product is proximate to a marking laser;

activating the marking laser to emit a laser beam onto the product; and detecting whether said laser beam was emitted by the marking laser in proper relation to said product indication signal;

displaying information at a customer interface related to one or more of said aforementioned steps.

82. The method of claim 81, wherein said detecting comprises detecting a heat change in said laser beam.

83. The method of claim 82, wherein said detecting further comprises:

emitting an optical signal across said laser beam on one side of said laser beam; and detecting said optical signal on the opposite side of said laser beam.

84. The method of claim 82, further comprising generating an error output signal if said laser beam was not emitted by said laser in proper relation to said product indication signal.

85. The method of claim 84, further comprising communicating said error output signal to a remote system.

86. The method of claim 84, further comprising:

transporting said product in an assembly line; and stopping the transport of the product when said error output signal is generated.

87. The method of claim 84, further comprising communicating said error output signal to a customer interface.

88. The method of claim 81, wherein said detecting further comprises generating a laser beam detection signal when said laser beam is emitted from said laser.

89. The method of claim 88, further comprising counting said laser beam detection signal to determine the number of products likely marked by said laser beam.

90. The method of claim 88, further comprising counting the number of products likely marked by counting said error output signals and counting said product indication signals and subtracting said error output signals from said product indication signals.

91. The method of claim 88, further comprising:

counting said product indication signals;

counting said laser beam detection signals; and generating an error output signal if the number of said product indication signals and number of said laser beam detection signals are different by more than a threshold value.

92. The method of claim 88, further comprising:

counting said product indication signals using a counter;

resetting said counter with said laser beam detection signals; and generating an error output signal if said counter has a value greater than a threshold value.

93. The method of claim 88, further comprising:

storing the time when said product indication signal is generated;

storing the time when said laser beam detection signal is generated; and generating an error output signal if the difference between the time for said product indication signal and the time for said laser beam detection signal differs by more than a threshold value.

94. A laser detection device that is responsive to a product indication signal to determine if a laser has emitted a laser beam towards a product, comprising:

a laser beam detector that generates a laser beam detection signal in response to the laser emitting the laser beam;

a controller that accepts as inputs the product indication signal and said laser beam detection signal, wherein said controller comprises:

a first counter that is responsive to the product indication signal to count the number of products likely marked by said laser beam; and a second counter that is responsive to said laser beam detection signal to counter the number laser beam emissions by said laser beam;

said controller configured to determine whether the laser emitted the laser beam in proper relation to the product indication signal, and generate an error output signal if the laser beam was not emitted in proper relation to the product indication signal based on a comparison of said first counter to said second counter.

95. A laser detection system for marking a product with a laser emitting a laser beam, comprising:

a product indicator that produces a product indication signal when the product is detected and causes the laser to emit the laser beam onto the product;

a laser beam detector that generates a laser beam detection signal in response to said laser beam;

a controller that accepts as inputs said product indication signal and said laser beam detection signal, wherein said controller comprises:

a first counter that is responsive to said product indication signal to count the number of products likely marked by said laser beam; and a second counter that is responsive to said laser beam detection signal to count the number laser beam emissions by said laser beam;

said controller configured to determine whether the laser emitted the laser beam in proper relation to said product indication signal, and generate an error output signal if the laser beam was not emitted in proper relation to said product indication signal based on a comparison of said first counter to said second counter.

96. A method for detecting if a marking laser has emitted a laser beam towards a product, comprising:

generating a product indication signal when said product is proximate to a marking laser;

activating the marking laser to emit a laser beam onto said product;

detecting whether said laser beam was emitted by the marking laser;

generating a laser beam detection signal when said laser beam is emitted from said laser;

counting said product indication signals using a counter;

resetting said counter with said laser beam detection signals; and generating an error output signal if said counter has a value greater than a threshold value.

97. A method for detecting if a marking laser has emitted a laser beam towards a product, comprising:

generating a product indication signal when said product is proximate to a marking laser;

activating the marking laser to emit a laser beam onto said product;

detecting whether said laser beam was emitted by the marking laser;

generating a laser beam detection signal when said laser beam is emitted from said laser;

storing the time when said product indication signal is generated;

storing the time when said laser beam detection signal is generated; and generating an error output signal if the difference between the time for said product indication signal and the time for said laser beam detection signal differs by more than a threshold value.

98. A laser detection device that is responsive to a product indication signal to determine if a laser has emitted a laser beam towards a product, comprising:

a laser beam detector that generates a laser beam detection signal in response to the laser emitting the laser beam;

a controller that accepts as inputs the product indication signal and said laser beam detection signal; and said controller configured to determine whether the laser emitted the laser beam in proper relation to the product indication signal;

said product indication signal comprises a signal indicative of the movement speed of the products.

99. The laser detection device of claim 98, wherein said product indication signal is a clock signal generated in relation to the speed of movement of said products.

* * * * *